US012190834B2

(12) United States Patent
Kang

(10) Patent No.: US 12,190,834 B2
(45) Date of Patent: *Jan. 7, 2025

(54) DISPLAY DEVICE AND LOCAL METHOD OF CONTROLLING LOCAL DIMMING THEREOF PRELIMINARY CLASS

(71) Applicant: LG ELECTRONICS INC., Seoul (KR)

(72) Inventor: Hyunku Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,318

(22) Filed: Jan. 5, 2023

(65) Prior Publication Data

US 2023/0154423 A1 May 18, 2023

Related U.S. Application Data

(63) Continuation of application No. 17/448,137, filed on Sep. 20, 2021, now Pat. No. 11,587,516.

(30) Foreign Application Priority Data

Oct. 30, 2020 (KR) ........................ 10-2020-0143692
Apr. 2, 2021 (KR) ........................ 10-2021-0043064

(51) Int. Cl.
*G09G 3/34* (2006.01)

(52) U.S. Cl.
CPC ....... *G09G 3/3426* (2013.01); *G09G 2310/08* (2013.01); *G09G 2320/08* (2013.01); *G09G 2360/16* (2013.01)

(58) Field of Classification Search
CPC ............. G09G 3/3426; G09G 2310/08; G09G 2320/08; G09G 2360/16
See application file for complete search history.

(56) References Cited

U.S. PATENT DOCUMENTS 9,877,362 B2 1/2018 Kang
10,123,385 B1 * 11/2018 Chang .................... H05B 45/46
(Continued)

FOREIGN PATENT DOCUMENTS

CN 104735843 6/2015
CN 104735843 A * 6/2015 ............. Y02B 20/40
(Continued)

OTHER PUBLICATIONS

U.S. Appl. No. 17/448,137, Office Action dated Apr. 11, 2022, 17 pages.
(Continued)

*Primary Examiner* — Towfiq Elahi
(74) *Attorney, Agent, or Firm* — LEE, HONG, DEGERMAN, KANG & WAIMEY

(57) ABSTRACT

A display device may include a display panel, a backlight unit including a plurality of blocks for providing light to the display panel, each of the plurality of blocks comprising a plurality of light emitting diodes (LEDs), and a controller configured to obtain backlight control information and to activate a duty ratio control function for controlling a duty ratio and current flowing in a block during a cycle of one frame, when a low current condition is satisfied based on the obtained backlight control information.

16 Claims, 12 Drawing Sheets

(56) References Cited

U.S. PATENT DOCUMENTS

| | | | | |
|---|---|---|---|---|
| 10,515,595 | B2 | 10/2019 | Seong et al. | |
| 10,902,799 | B2 | 1/2021 | Song et al. | |
| 2010/0026201 | A1* | 2/2010 | Byun | H05B 45/38 315/287 |
| 2014/0339993 | A1 | 11/2014 | Tseng | |
| 2015/0103105 | A1 | 4/2015 | Kim et al. | |
| 2015/0124003 | A1* | 5/2015 | Mio | G09G 3/3406 345/690 |
| 2016/0143103 | A1* | 5/2016 | Kang | H05B 47/175 315/210 |
| 2020/0090598 | A1 | 3/2020 | Sohn et al. | |
| 2021/0329760 | A1* | 10/2021 | Kim | H05B 45/36 |
| 2022/0139345 | A1 | 5/2022 | Kang | |

FOREIGN PATENT DOCUMENTS

| | | |
|---|---|---|
| CN | 111654948 | 9/2020 |
| EP | 2624243 | 5/2019 |
| JP | 2010040209 | 2/2010 |
| KR | 1020100012599 | 2/2010 |
| KR | 1020160087036 | 7/2016 |
| KR | 1020160124587 | 10/2016 |
| KR | 1020180074563 | 7/2018 |
| KR | 1020200046516 | 5/2020 |

OTHER PUBLICATIONS

U.S. Appl. No. 17/448,137, Notice of Allowance dated Oct. 13, 2022, 7 pages.

PCT International Application No. PCT/KR2021/011735, International Search Report dated Nov. 24, 2021, 3 pages.

Korean Intellectual Property Office Application No. 10-2021-0043064, Office Action dated Dec. 7, 2022, 5 pages.

European Patent Office Application Serial No. 21886531.9, Search Report dated Jul. 23, 2024, 11 pages.

* cited by examiner

DISPLAY DEVICE AND LOCAL METHOD OF CONTROLLING LOCAL DIMMING THEREOF PRELIMINARY CLASS

CROSS-REFERENCE TO RELATED APPLICATIONS

This application is a continuation of U.S. patent application Ser. No. 17/448,137, filed on Sep. 20, 2021, which pursuant to 35 U.S.C. § 119 (a), claims the benefit of an earlier filing date and right of priority to Korean Patent Application Nos. 10-2020-0143692 filed on Oct. 30, 2020, and 10-2021-0043064 filed on Apr. 2, 2021, the contents of which are all hereby incorporated by reference herein in their entireties.

BACKGROUND

The present disclosure relates to a display device and a method of operating the same, and more particularly, to a display device, which performs local dimming, and a method of controlling local dimming thereof.

An active matrix liquid crystal display device displays moving images using a thin film transistor (hereafter, referred to as a "TFT") that is a switching element.

A liquid crystal display device can be manufactured in a small size, as compared with a Cathode Ray Tube (CRT), so it is used for not only a portable information device, an office device, and a display device such as a computer, but also a television. Accordingly, the liquid crystal display device has rapidly replaced the CRT.

A transmissive liquid crystal display device that occupies most of liquid crystal display devices displays an image by modulating light from a backlight unit by controlling an electric field that is applied to a liquid crystal layer.

Meanwhile, backlight dimming methods have been proposed to reduce power consumption of a backlight unit. Local dimming, which is one of the backlight dimming methods, may improve contrast by locally controlling luminance of a display surface within one frame cycle.

The local dimming method may be a method for separating input image data according to virtual blocks divided in a matrix form on a display screen of a liquid crystal display panel, deriving a representative value of the input image data for each block, and adjusting a dimming value for each block according to the representative value for each block so as to control the brightness of light sources of a backlight unit for each block.

Conventionally, since local dimming data is converted into analog data and received, low voltage control is required to control LED current in a low grayscale region.

In particular, at a low voltage of 0.5 V or less, external noise is easily introduced and accurate control is difficult.

SUMMARY

An object of the present disclosure is to accurately control current flowing in an LED in a low voltage region during local dimming control.

An object of the present disclosure is to accurately control current flowing in an LED when low voltage control is required during local dimming control.

A display device according to an embodiment of the present disclosure may include a display panel, a backlight unit including a plurality of blocks for providing light to the display panel, each of the plurality of blocks comprising a plurality of light emitting diodes (LEDs), and a controller configured to obtain backlight control information and to activate a duty ratio control function for controlling a duty ratio and current flowing in a block during a cycle of one frame, when a low current condition is satisfied based on the obtained backlight control information.

The duty ratio control function may control the duty ratio and the current such that a product (a*b) of an increase multiple a of current flowing in the block and the duty ratio b becomes 1.

The backlight control information may include a voltage value applied to the block, and the controller may determine a value of current flowing in the block based on the voltage value, and determine that the low current condition is satisfied, when the determined current value is less than a predetermined value.

The backlight control information may include a PWM dimming duty ratio value, and the controller determines that the low current condition is satisfied, when the PWM dimming duty ratio value is less than a predetermined value.

DETAILED DESCRIPTION OF THE EMBODIMENTS

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

It will be understood that, although the terms first, second, etc. may be used herein to describe various elements of the present invention, these terms are only used to distinguish one element from another element and essential, order, or sequence of corresponding elements are not limited by these terms.

A singular representation may include a plural representation unless context clearly indicates otherwise.

It will be understood that the terms “comprise”, “include”, etc., when used in this specification, specify the presence of several components or several steps and part of the components or steps may not be included or additional components or steps may further be included.

Figure 1:
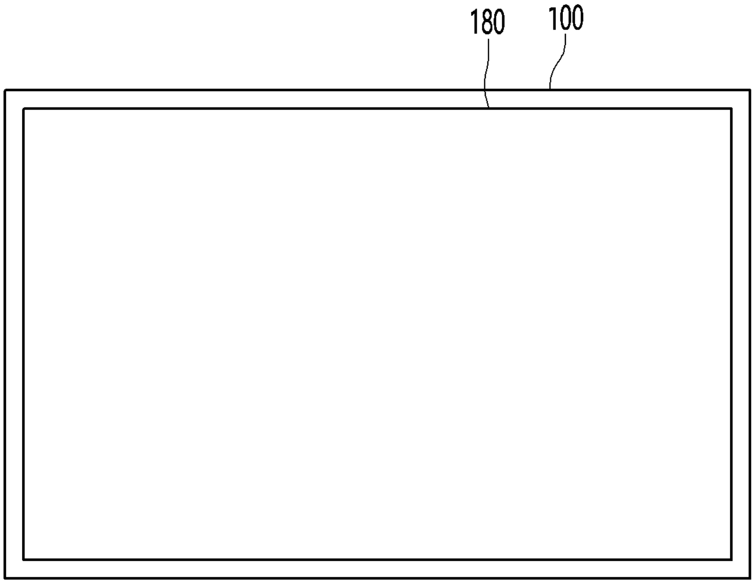
FIG. 1 is a diagram illustrating a display device according to an embodiment of the present disclosure.

FIG. 1 is a diagram illustrating a display device according to an embodiment of the present invention.

With reference to the drawings, a display device 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (ILED) panel (ILED panel).

According to the present invention, the display 180 is assumed to include a liquid crystal display panel (LCD panel).

On the other hand, examples of the display device 100 in FIG. 1 include a monitor, a TV, a tablet PC, a mobile terminal, and so on.

Figure 2:
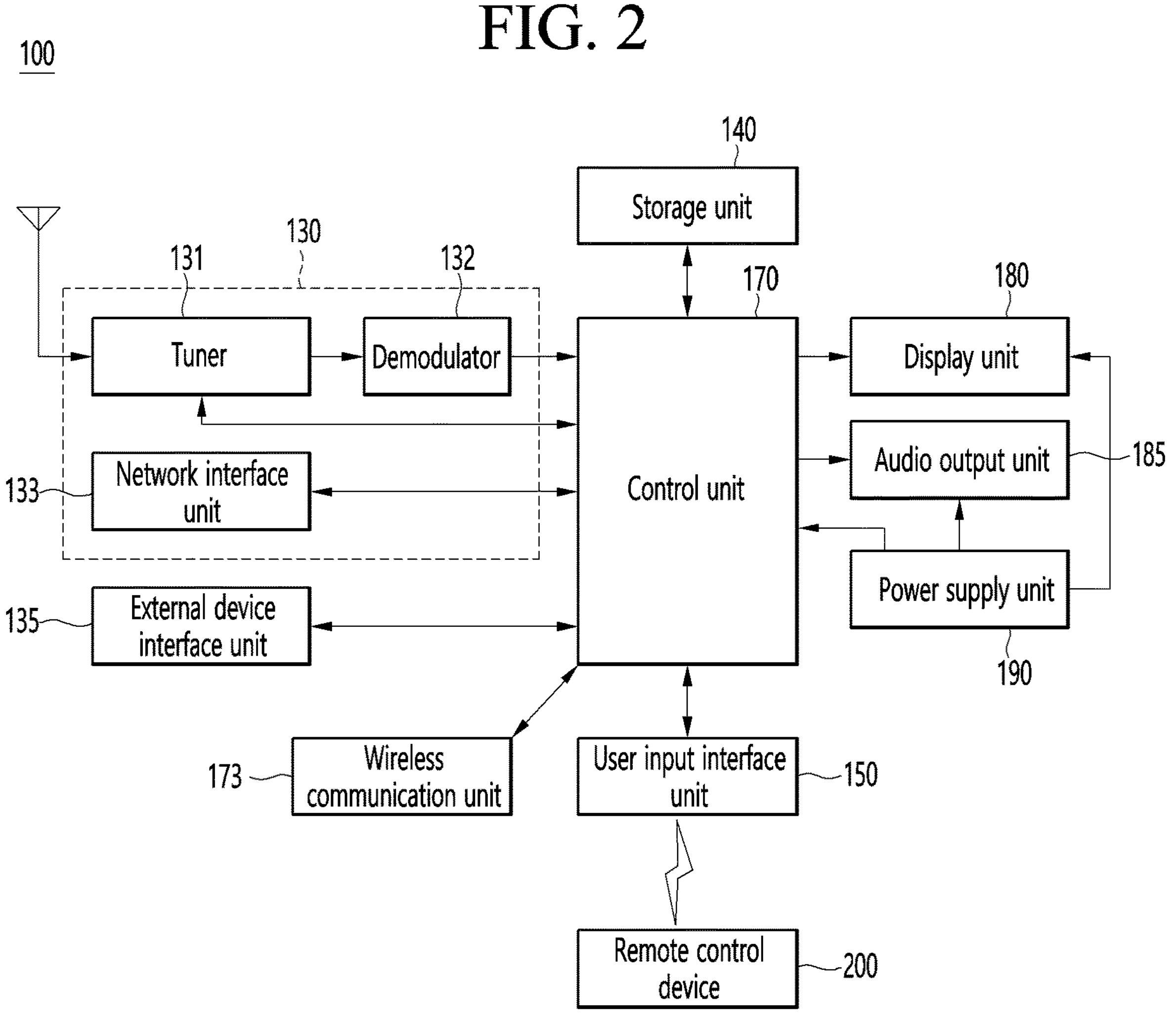
FIG. 2 is an example of a block diagram of the configuration of the display device in FIG. 1.

FIG. 2 is an example of a block diagram of the configuration of the display device in FIG. 1.

Referring to FIG. 2, a display device 100 can include a broadcast receiver 130, an external device interface 135, a storage 140, a user input interface 150, a controller 170, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller.

The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The user input interface 150 can deliver signals inputted from a user to the controller 170 or deliver signals from the controller 170 to a user. For example, the user input interface 150 can receive or process control signals such as power on/off, channel selection, and screen setting from the remote controller 200 or transmit control signals from the controller 170 to the remote controller 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device.

For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured.

Additionally, a function performed by each block is to describe an embodiment of the present invention and its specific operation or device does not limit the scope of the present invention.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a dc/dc converter for converting a level of the DC source power.

The remote controller 200 transmits a user input to the user input interface 150. To this end, the remote controller 200 may use Bluetooth, radio frequency (RF) communication, infrared (IR) communication, ultra wideband (UWB), ZigBee, or the like. In addition, the remote controller 200 may receive video, audio, or data signal output from the user input interface 150 and display the video, audio, or data signal or output sound.

Figure 3:
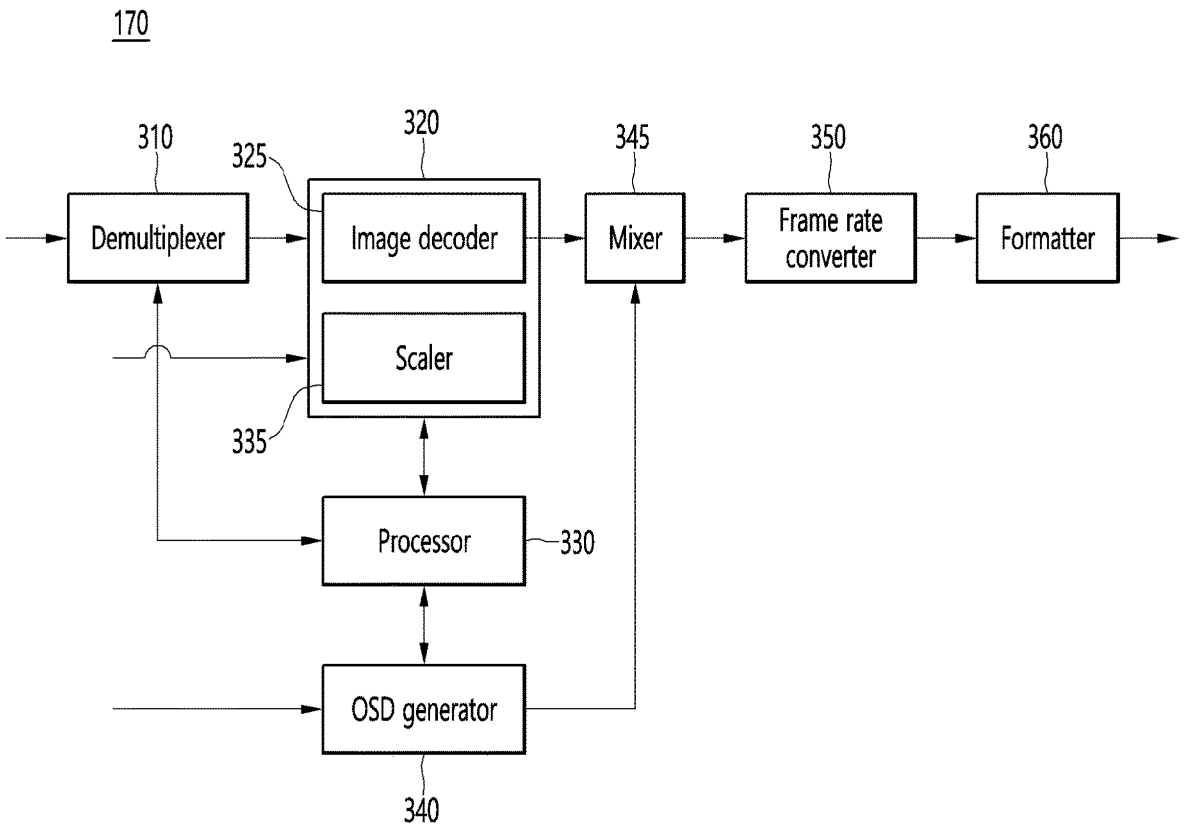
FIG. 3 is an example of a block diagram of the inside of a controller in FIG. 2.

FIG. 3 is an example of a block diagram of the inside of a controller in FIG. 2.

For description with reference to the drawings, the controller 170 according to an embodiment of the present invention includes a demultiplexer 310, an image processor 320, a processor 330, an OSD generator 340, a mixer 345, a frame rate converter 350, and a formatter 360. In addition, an audio processor (not illustrated) and a data processor (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner 110, the demodulator 120, or the external device interface 135.

The image processor 320 performs image processing of the image signal that results from the demultiplexing. To do this, the image processor 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the display device 100 or within the controller 170. For example, the processor 330 controls the tuner 110 in such a manner that the tuner 110 performs the selection of (tuning to) the RF broadcast that corresponds to the channel selected by the user or the channel already stored.

In addition, the processor 330 controls the display device 100 using the user command input through the user input interface 150, or the internal program.

In addition, the processor 330 performs control of transfer of data to and from the network interface 133 or the external device interface 135.

In addition, the processor 330 controls operation of each of the demultiplexer 310, the image processor 320, the OSD generator 340, and so on within the controller 170.

The OSD generator 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the display device 100, various menu screens, a widget, an icon, and so on. In addition, the OSD generated signal includes a 2D object or a 3D object.

In addition, based on a pointing signal input from the remote controller 200, the OSD generator 340 generates a pointer possibly displayed on the display. Particularly, the pointer is generated in a pointing signal processor, and an OSD generator 340 includes the pointing signal processor (not illustrated). Of course, it is also possible that instead of being providing within the OSD generator 340, the pointing signal processor (not illustrated) is provided separately.

The mixer 345 mixes the OSD signal generated in the OSD generator 340, and the image signal that results from the image processing and the decoding in the image processor 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processor (not illustrated) within the controller 170 performs audio processing of an audio signal that results from the demultiplexing. To do this, the audio processor (not illustrated) includes various decoders.

In addition, the audio processor (not illustrated) within the controller 170 performs processing for base, treble, volume adjustment and so on.

The data processor (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4:
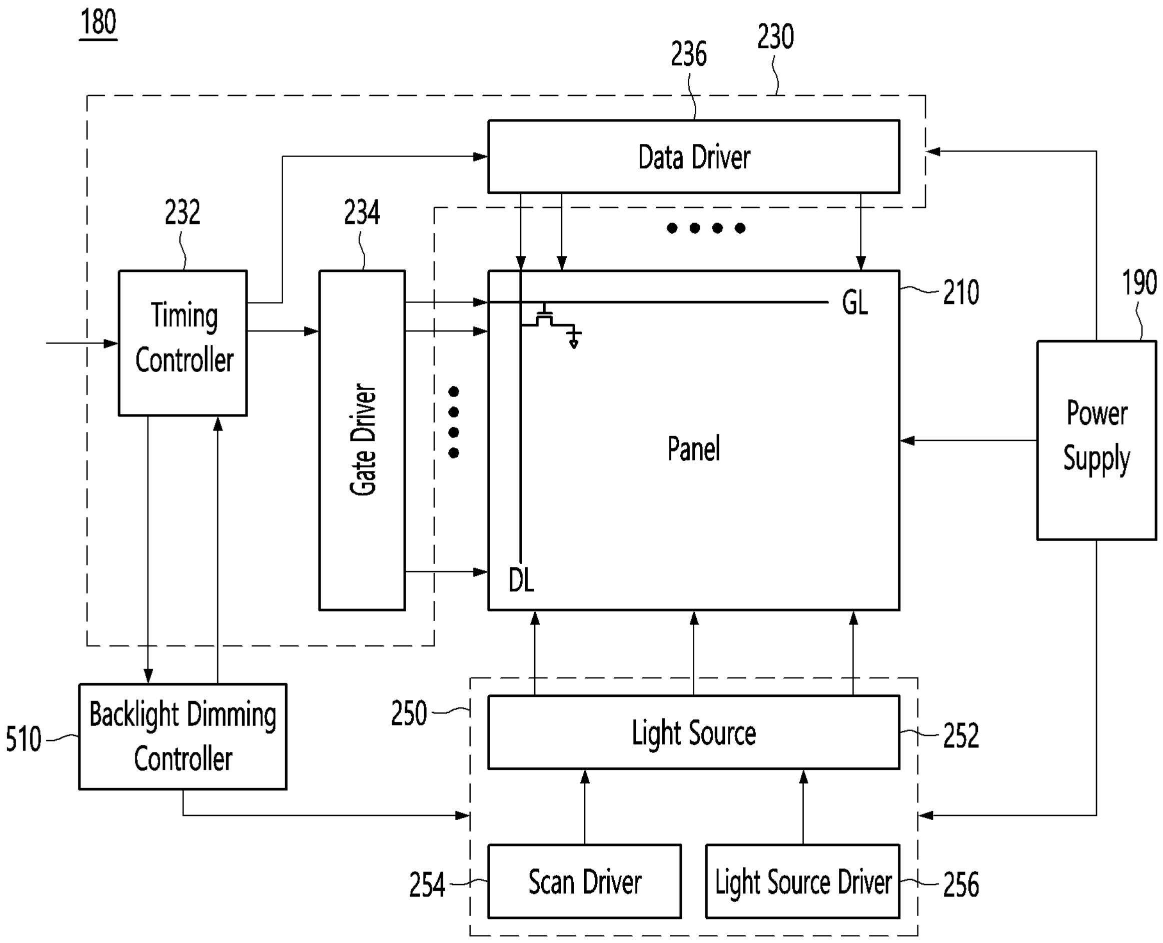
FIG. 4 is a block diagram of the inside of a power supply and a display of FIG. 2.

FIG. 4 is a block diagram of the inside of the power supply and the display of FIG. 2.

Referring to the figure, the display 180 based on a liquid crystal panel (LCD panel) may include a liquid crystal display panel 210, a driving circuit 230, a backlight unit 250, and a backlight dimming controller 510.

The liquid crystal display panel 210, in order to display an image, includes: a first substrate in which a plurality of gate lines GL and data lines DL are disposed across each other in a matrix shape, thin film transistors and pixel electrodes connected with the thin film transistors are formed at the intersections; a second substrate having common electrodes; and a liquid crystal layer formed between the first substrate and the second substrate.

The driving circuit 230 drives the liquid crystal display panel 210 in response to a control signal and a data signal that are supplied from the controller 170 of FIG. 1. To this end, the driving circuit 230 includes a timing controller 232, a gate driver 234, and a data driver 236.

The timing controller 232 receives a control signal, R, G, B data signal, a vertical synchronization signal Vsync etc. from the controller 170, controls the gate driver 234 and the data driver 236 in response to the control signal, and rearranges and provides the R, G, B data signal to the data driver 236.

By control of the gate driver 234, the data driver 236, and the timing controller 232, a scan signal and an image signal are supplied to the liquid crystal display panel 210 through a gate line GL and a data line DL.

The backlight unit 250 supplies light to the liquid crystal display panel 210. To this end, the backlight unit 250 may include a plurality of light sources 252, a scan driver 254 that controlling scanning driving of the light sources 252, and a light source driver 256 that turns on/off the light sources 252.

A predetermined image is displayed using light emitted from the backlight unit 250 with the light transmittance of the liquid crystal layer adjusted by an electric field generated between the pixel electrode and the common electrode of the liquid crystal display panel 210.

The power supply 190 can supply a common electrode voltage Vcom to the liquid crystal display panel 210 and a gamma voltage to the data driver 236. Further, the power supply 190 can supply driving power for driving the light sources 252 to the backlight unit 250.

Meanwhile, the backlight unit 250 can be divided and driven into a plurality of blocks. The controller 170 can control the display 180 to perform local dimming by setting a dimming value for each block. In detail, the timing controller 232 can output input image data RGB to the backlight dimming controller 510 and the backlight dimming controller 510 can calculate a dimming value for each of a plurality of blocks on the basis of the input image data RGB received from the timing controller 232.

Figure 5:
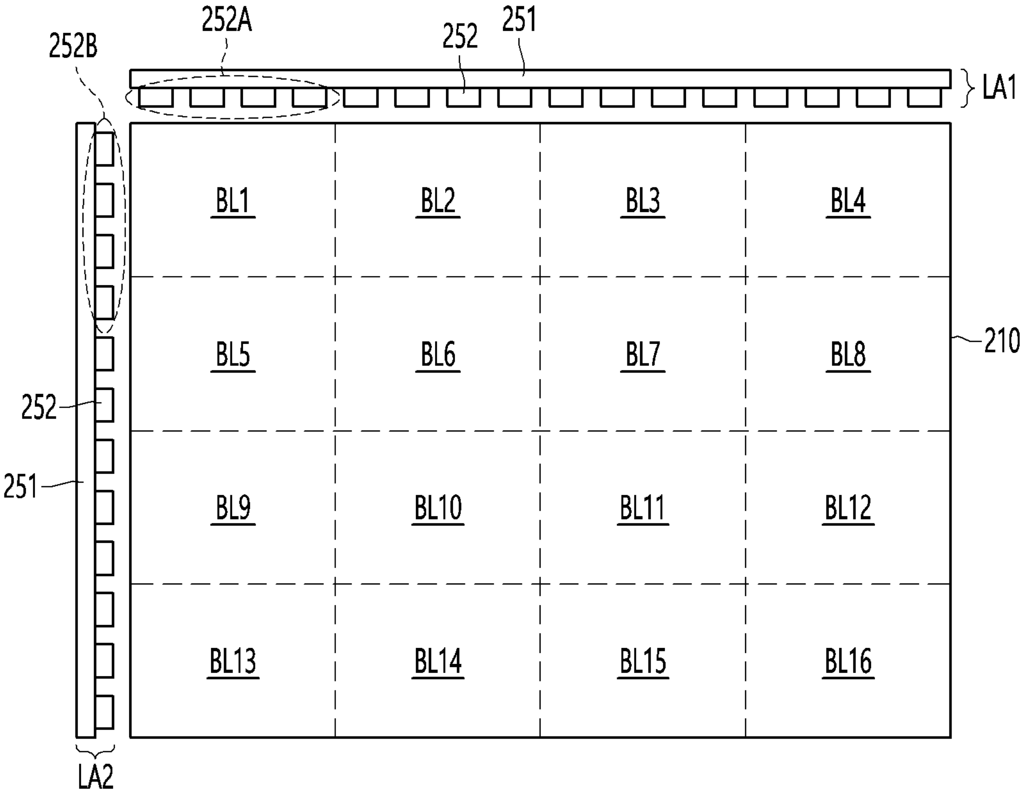
FIG. 5 is an example showing arrangement of a liquid crystal display panel and light sources in an edge type backlight unit.
Figure 6:
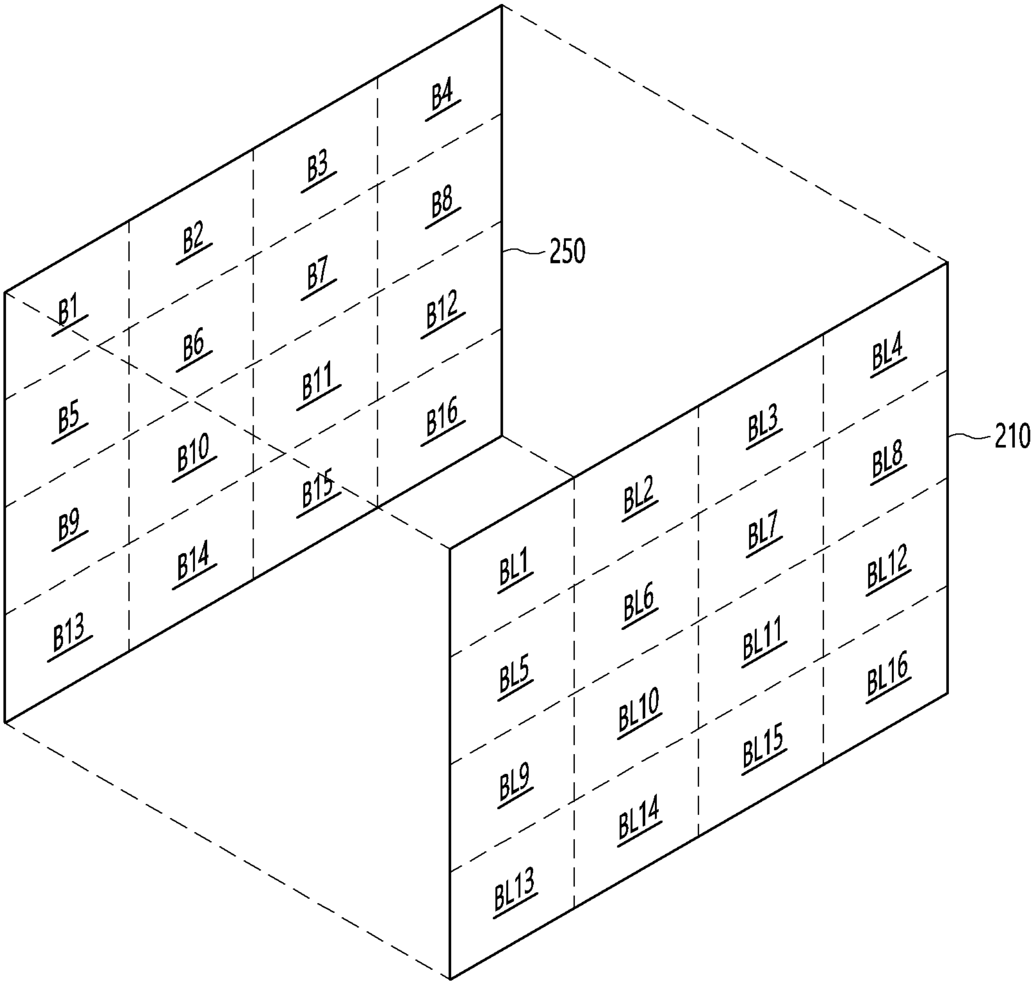
FIG. 6 is an example showing arrangement of a liquid crystal display panel and light sources in a direct-type backlight unit.

FIG. 5 is an example showing arrangement of a liquid crystal display panel and light sources in an edge type backlight unit and FIG. 6 is an example showing arrangement of a liquid crystal display panel and light sources in a direct-type backlight unit.

The liquid crystal display panel 210 may be divided into a plurality of virtual blocks, as shown in FIGS. 5 and 6. Although the liquid crystal display panel 210 is equally divided into sixteen blocks BL1 to BL16 in FIGS. 5 and 6, it should be noted that the liquid crystal display panel 210 is not limited thereto. Each of the blocks may include a plurality of pixels.

The backlight unit 250 may be implemented into any one of an edge type and direct type.

The edge-type backlight unit 250 has a structure in which a plurality of optical sheets and a light guide plate are stacked under the liquid crystal display panel 210 and a plurality of light sources is disposed on the sides of the light guide plate. When the backlight unit 250 is an edge-type backlight unit, the light sources are disposed on at least any one of the top and the bottom and at least any one of the left and right sides of the liquid crystal display panel 210. It is exemplified in FIG. 6 that a first light source array LA1 is disposed on the top of the liquid crystal display panel 210 and a second light source array LA2 is disposed on the left side of the liquid crystal display panel 210. The first and second light source arrays LA1 and LA2 each include a plurality of light sources 252 and a light source circuit board 251 on which the light sources 252 are mounted. In this case, the brightness of the light traveling into the first block BL2 of the light source array can be adjusted using the light sources 252A of the first light source array LA1 disposed at a position corresponding to the first block BL2 and the light sources 252B of the second light source array LA2.

The direct-type backlight unit 250 has a structure in which a plurality of optical sheets and a diffuser plate are stacked under the liquid crystal display panel 210 and a plurality of light sources is disposed under the diffuser plate.

When the backlight unit 250 is a direct-type backlight unit, it is divided to correspond one to one to the blocks BL1 to BL16 of the liquid crystal display panel 210, as shown in FIG. 6. In this case, the brightness of the light traveling into the first block BL2 of the light source array can be adjusted using the light sources 252 included in the first block BL1 of the backlight unit 250 disposed at a position corresponding to the first block BL1 of the liquid crystal display panel 210.

The light sources 252 may be point light sources such as a Light Emitting Diode (LED). The light sources 252 are turned on and off in response to light source driving signals LDS from the light source driver 256. The light sources 252 can be adjusted in intensity of light in accordance with the amplitudes of the light source driving signals LDS and can be adjusted in turning-on time in accordance with the pulse width. The brightness of light that is outputted from the light sources 252 may be adjusted in accordance with the light source driving signal LDS.

The light source driver 256 can generate and output light source driving signals LDS to the light sources 252 on the basis of the dimming values of the blocks inputted from the backlight dimming controller 510. The dimming values of the blocks, which are values for performing local dimming, may be the brightness of the light that is outputted from the light sources 252.

Figure 7:
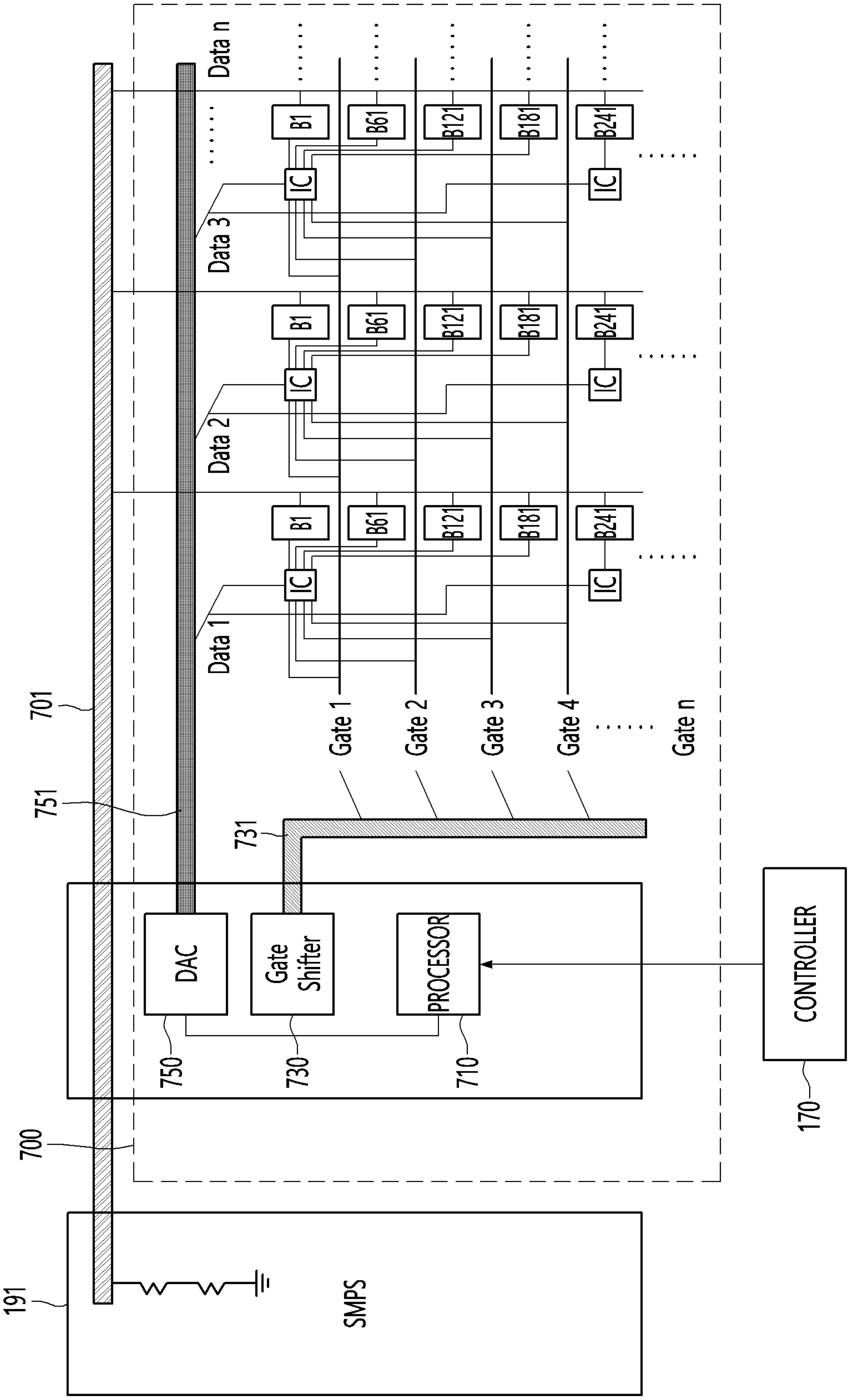
FIG. 7 is a view illustrating the detailed configuration of a backlight unit according to an embodiment of the present disclosure.

FIG. 7 is a view illustrating the detailed configuration of a backlight unit according to an embodiment of the present disclosure.

In particular, FIG. 7 is a view illustrating the configuration of the backlight unit 700 having an active matrix structure.

The active matrix structure may be a structure for controlling a local dimming value of each of a plurality of blocks configuring the backlight unit 700.

Specifically, the active matrix structure may be a structure in which local dimming data input to each gate line shall be maintained during a cycle corresponding to one image frame.

The local dimming data may include information on a voltage applied to a corresponding block or a value of current flowing in an LED configuring the corresponding block.

Referring to FIG. 7, the backlight unit 700 having the active matrix structure may include a processor (or MCU) 710, a gate shifter 730, a digital-analog converter 750, a plurality of blocks B1 to Bn, a plurality of IC chips, a plurality of data lines Data 1 to Data n and a plurality of gate lines Gate 1 to Gate n.

A switching mode power supply 191 may supply power to the backlight unit 700 through a power cable 701.

The processor 710 may control overall operation of the backlight unit 700.

Although the processor 710 is described as being configured separately from the controller 170 of FIG. 2, the present disclosure is not limited thereto and the processor may be included in the controller 170.

The processor 710 may receive backlight control information from the controller 170. The backlight control information may be referred to as local dimming data.

The backlight control information may be digital information.

The backlight control information may include one or more of a value of a voltage applied to a block or a PWM dimming duty ratio value.

The backlight control information may include information for local dimming of the plurality of blocks B1 to Bn.

The gate shifter 730 may sequentially apply a gate on signal to each of the plurality of gate lines Gate 1 to Gate n through a gate cable 731.

The gate on signal may be a signal for maintaining a value of current flowing in a corresponding block until a frame of a next cycle is generated.

The gate shifter 730 may be included in the scan driver 254 of FIG. 4.

The digital-analog converter (DAC) 750 may convert the digital type of the local dimming data received from the processor 710 into an analog type.

The DAC 750 may transmit the converted analog local dimming data to each IC chip IC.

The analog local dimming data may include a value of a voltage which will be applied to the corresponding block.

The IC chip IC may apply the voltage value received from the DAC 750 to the corresponding block. Therefore, current corresponding to the voltage value may flow in the LED included in the corresponding block.

Each of the plurality of blocks B1 to B243 may include a plurality of LEDs connected in series. Since the plurality of LEDs included in one block is connected in series, current flowing in one block may be equal to current flowing in the LEDs included in the corresponding block.

Vertically connected blocks among the plurality of blocks B1 to B243 may be connected in parallel to each other.

Each of the plurality of IC chips may manage some of a plurality of blocks.

Each of the plurality of IC chips may control current flowing in a managed block based on the local dimming value. The local dimming value may be an analog voltage value for local dimming.

Each of the plurality of IC chips may control a block or LED such that a current value corresponding to the analog voltage value flows in each block.

The plurality of data lines Data 1 to Data n may be connected to the DAC 750 through a data cable 751.

Analog local dimming data may be transmitted to the IC chip IC through each data line.

The plurality of gate lines Gate 1 to Gate n may be connected to the gate shifter 730 through a gate cable 731.

Figure 8:
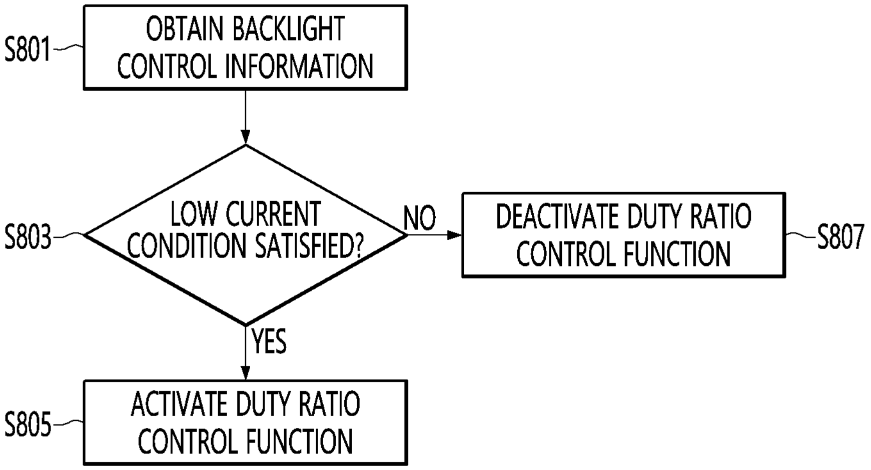
FIG. 8 is a flowchart illustrating a method of operating a display device according to an embodiment of the present disclosure.

FIG. 8 is a flowchart illustrating a method of operating a display device according to an embodiment of the present disclosure.

In particular, FIG. 8 is a flowchart illustrating a method of controlling the backlight unit 700 having the active matrix structure.

In FIG. 8, the function of the processor 710 may be performed by the controller 170.

Referring to FIG. 8, the processor 710 of the backlight unit 700 obtains backlight control information (S801).

In an embodiment, the processor 710 may receive the backlight control information from the controller 170 provided on a main board.

In an embodiment, the backlight control information may include a value of current flowing in any one of the plurality of blocks.

The processor 710 may detect a current value based on the backlight control information (or the local dimming data) received from the controller 170. Specifically, the processor 710 may extract a voltage value included in the backlight control information, and detect a current value corresponding to the extracted voltage value.

The voltage value may be a value for controlling current flowing in a corresponding block.

The processor 710 may detect a current value corresponding to the voltage value using a lookup table in which the voltage value corresponds to the current value.

This will be described with reference to FIG. 9.

Figure 9:
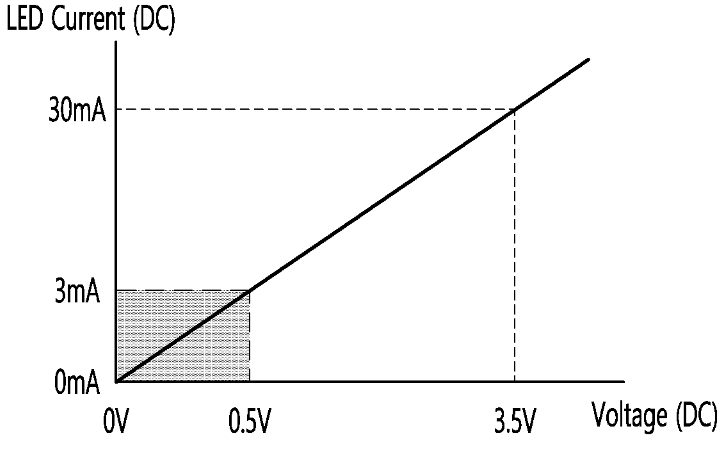
FIG. 9 is a graph showing a relationship between a voltage and current for local dimming control according to an embodiment of the present disclosure.

FIG. 9 is a graph showing a relationship between a voltage and current for local dimming control according to an embodiment of the present disclosure.

In the graph of FIG. 9, a horizontal axis is a DC voltage to be applied to LEDs included in the block and a vertical axis is DC current flowing in the LEDs.

The backlight control information may include a value of a voltage to be applied to the LEDs.

The processor 710 may transmit a digital voltage value to the DAC 750. The DAC 750 may convert a digital voltage value into an analog voltage value.

The DAC 750 may transmit the converted analog voltage value to the IC chip. The IC chip may adjust current flowing in the LEDs to a value matching the voltage value, using the received analog voltage value.

That is, the backlight unit 700 may extract the voltage value of the block from the local dimming data received from the controller 170, and detect a current value corresponding to the voltage value extracted from the graph of FIG. 9.

The backlight unit 700 may control the LEDs such that the detected current value flows in the LEDs.

FIG. 8 will be described again.

In another example, the backlight control information may include a PWM (Pulse Width Modulation) dimming duty ratio value.

The backlight control information may include one or more of a value of current flowing in any one of the plurality of blocks or a PWM dimming duty ratio value.

The PWM dimming duty ratio value may be a value input through a UI menu for adjusting the brightness of a screen displayed on a display panel. The controller 170 may transmit the obtained PWM dimming duty ratio value to the processor 710.

The processor 710 of the backlight unit 700 determines whether a low current condition is satisfied based on the backlight control information (S803).

In an embodiment, the low current condition may be satisfied when the current value detected in step S801 is less than a predetermined value.

In another embodiment, the low current condition may be satisfied when the PWM dimming duty ratio value obtained in step S801 is less than the predetermined value.

The processor 710 activates a duty ratio control function when the low current condition is satisfied (S805), and deactivates the duty ratio control function when the low current condition is not satisfied (S807).

In an embodiment, the duty ratio control function may be a function of controlling a duty ratio and current flowing in the block during a cycle of one frame.

In an embodiment, the duty ratio control function may be a function of adjusting a duty ratio and current flowing in the block or the LEDs included in the block such that a product (a*b) of an increase multiple a of current and the duty ratio b becomes 1.

For example, when the increase multiple of current is twice and the duty ratio is 50%, a product (2*0.5) of two factors may be 1. In this case, the duty ratio control function may be a function of allowing current of 0 to flow in the corresponding block during a half cycle of one frame and allowing current of twice an existing value to flow in the corresponding block during the other half cycle.

As another example, when the increase multiple of current is 4 times, the duty ratio may be determined to be 25%. In this case, the duty ratio control function may be a function of allowing current of 0 to flow in the corresponding block during ¾ cycle of one frame and allowing current of 4 times an existing value to flow in the corresponding block during the other half cycle.

Meanwhile, the increase multiple a of current and the duty ratio b may vary according to the communication speed between the processor 710 and the DAC 750.

The processor 710 and the DAC 750 may perform serial peripheral interface (SPI) communication.

In an embodiment, the processor 710 may determine the communication speed with the DAC 750, and determine any one of the increase multiple a of current and the duty ratio b based on the measured communication speed.

The processor 710 may transmit the local dimming data to the DAC 750, measure a time until receiving an ACK signal in response thereto, and measure the communication speed.

For example, the processor 710 may increase the increase multiple a of current as the measured communication speed increases, and decrease the increase multiple a of current as the communication speed decreases.

When the duty ratio control function is deactivated, the processor 710 may control the gate shifter 730 and the DAC 750 such that the gate signal is output during half of one frame and the data signal is output during the other half.

Figure 10:
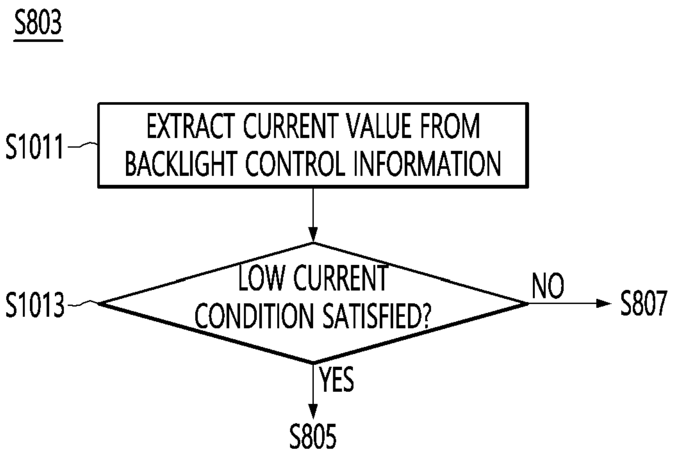
FIGS. 10 and 11 are flowcharts illustrating a process of determining whether a low condition is satisfied according to various embodiments of the present disclosure.
Figure 11:
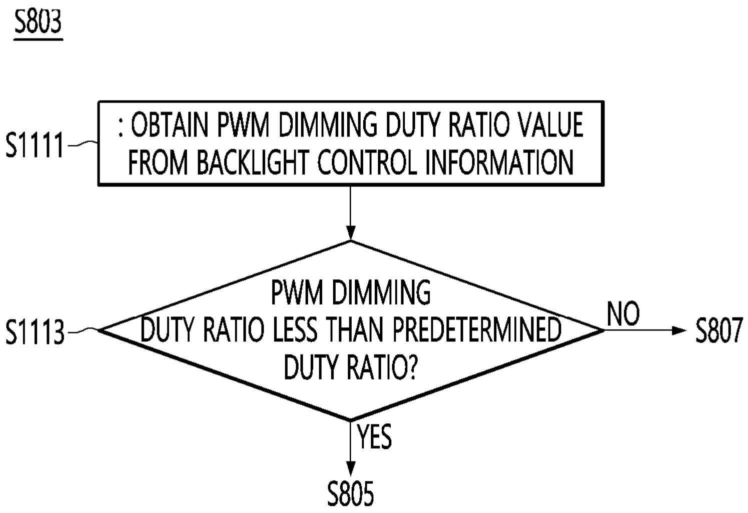

FIGS. 10 and 11 are flowcharts illustrating a process of determining whether a low condition is satisfied according to various embodiments of the present disclosure.

That is, FIGS. 10 and 11 are detailed views of step S803 of FIG. 8.

First, FIG. 10 will be described.

The processor 710 of the backlight unit 700 extracts a current value from the backlight control information (S1011).

The processor 710 may extract a current vale for LED control based on a voltage value included in the backlight control information.

The processor 710 may extract the current value corresponding to the voltage value from the lookup table in which a correspondence relation between the voltage value and the current value for local dimming is stored or the graph of FIG. 9.

The current value may be a value of current flowing in one block. Since a plurality of LEDs is connected in series in one block, the same current may flow in each LED.

The processor 710 of the backlight unit 700 determines whether the extracted current value is less than a predetermined current value (S1013).

The predetermined value may be 3 mA, but this is merely an example.

The processor 710 of the backlight unit 700 may activate the duty ratio control function (S805) when the extracted current value is less than the predetermined current value, and may deactivate the duty ratio control function (S807) when the extracted current value is equal to or greater than the predetermined value.

Next, FIG. 11 will be described.

The processor 710 of the backlight unit 700 obtains a PWM dimming duty ratio value from the backlight control information (S1111).

The backlight control information may include a PWM dimming duty ratio value (unit %) for local dimming.

The PWM dimming duty ratio value may be received from the controller 170 or a main board.

The controller 170 may read the PWM dimming duty ratio value input on the UI menu for screen brightness control. The controller 170 may transmit the read PWM dimming duty ratio value to the processor 710 of the backlight unit 700.

The processor 710 of the backlight unit 700 determines whether the obtained PWM dimming duty ratio value is less than a predetermined duty ratio value (S1113).

The predetermined value may be 40%, but this is merely an example.

The processor 710 of the backlight unit 700 may activate the duty ratio control function (S805) when the extracted PWM dimming duty ratio value is less than the predetermined duty ratio value, and may deactivate the duty ratio control function when the extracted PWM dimming duty ratio value is equal to or greater than the predetermined duty ratio value (S807).

Figure 12:
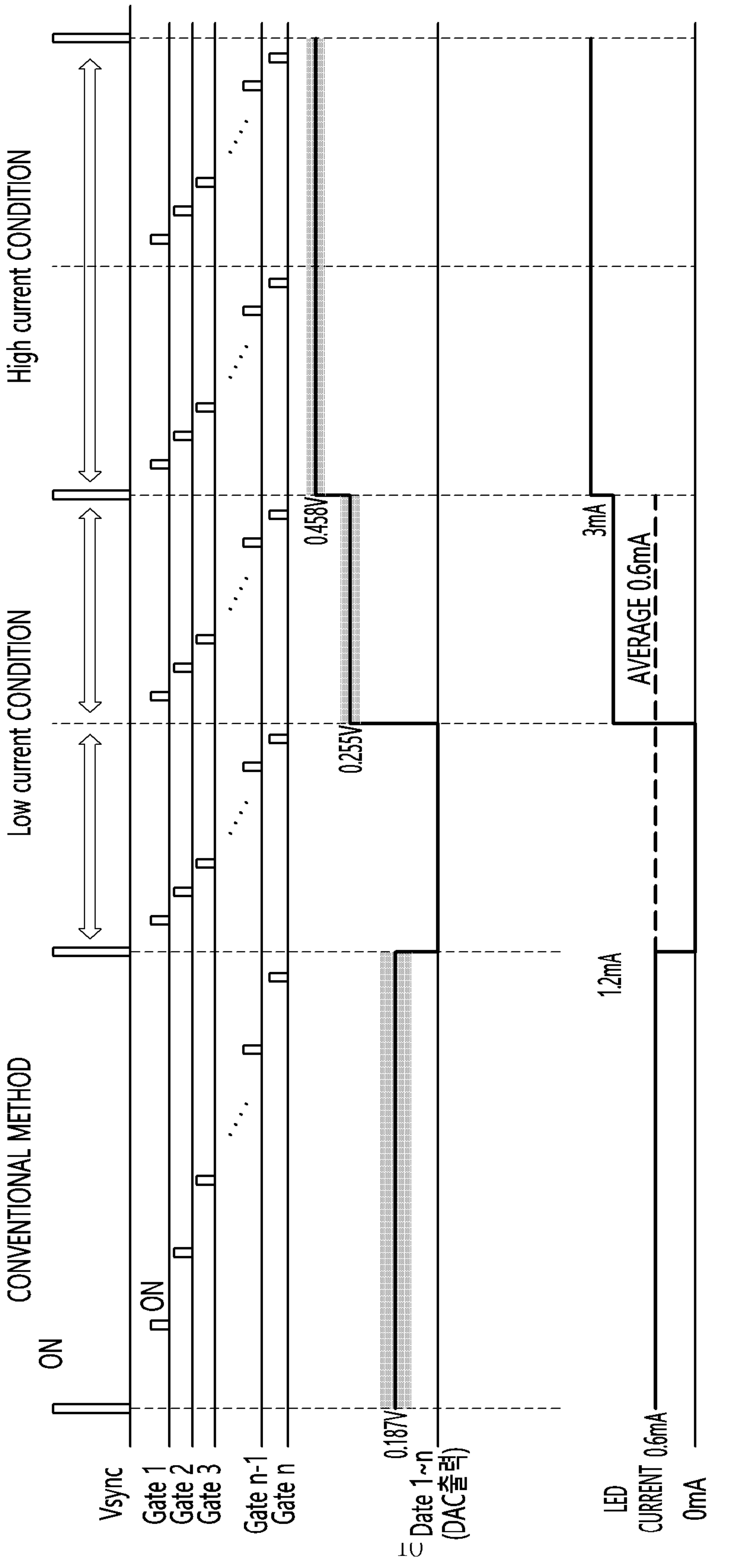
FIG. 12 is a view showing comparison between a conventional local dimming control method and a local dimming control method according to an embodiment of the present disclosure.

FIG. 12 is a view showing comparison between a conventional local dimming control method and a local dimming control method according to an embodiment of the present disclosure.

FIG. 12 is a timing diagram of a vertical synchronization signal Vsync, a plurality of gate signals Gate 1 to Gate n, a plurality of data signals Data 1 to Data n, a current signal flowing in the LED (LED current), for a cycle of one frame.

According to a conventional dimming method, the LED current value has a fixed value without being changed during the cycle of one frame.

However, according to the embodiment of the present disclosure, under a low current condition, current flowing in the LED may be 0 during a half cycle of one frame and current flowing in the LED may increase to twice (1.2 mA) an existing value (0.6 mA) during the other half cycle. That is, the duty ratio control function may be activated.

The existing value may be a value of current flowing in the LED during one cycle of a previous frame. The timing diagram of the conventional method may correspond to a previous frame.

The processor 710 may control the voltage applied to the LED, in order to double current applied to the LED during a half cycle of one frame.

Specifically, the processor 710 may extract a voltage value, at which the value of the LED current is twice an existing value, and transmit the extracted voltage value to an IC chip through the DAC 750. The IC chip may control the LED such that the transmitted voltage value is applied.

The low current condition may be satisfied when a current value for local dimming obtained based on the backlight control information is less than a predetermined value or when a PWM dimming duty ratio value is less than a predetermined value.

Under the low current condition, the duty ratio control function is activated because low voltage control is necessary to control the LED current in a low grayscale region.

When the voltage is affected by external noise at a low voltage, accurate LED current control is difficult. When LED current control is not accurately performed, local dimming for a low grayscale region is not properly performed, which may interrupt viewing of an image.

In order to solve such a problem, according to the embodiment of the present disclosure, under a low current condition, during a half cycle of one frame, control for increasing the voltage applied to the LED may be performed to double LTE current.

Accordingly, it is less affected by introduction of external noise and accurate control of LED current may be performed.

During the first half cycle of one frame, current flowing in the block may be 0 and, during the other half cycle, current flowing in the block may be twice an existing value. That is, as the current value during the following half cycle is doubled, sharpness of the image may be improved.

Meanwhile, a high current condition may correspond to the case where the low current condition is not satisfied. The high current condition may be satisfied when a current value for local dimming obtained based on the backlight control information is equal to or greater than a predetermined value or a PWM dimming duty ratio value is equal to or greater than a predetermined value.

As shown in FIG. 12, under the low current condition and the high current condition, when the duty ratio is 50%, a gate signal may be turned on twice during the cycle of one frame. When the duty ratio is 50%, a data signal is 0 (a voltage value is 0) during the half cycle.

Under the low current condition and the high current condition, when the duty ratio is 25%, a gate signal may be turned on four times during the cycle of one frame. When the duty ratio is 25%, a data signal is 0 (a voltage value is 0) during ¾ cycle.

Figure 13:
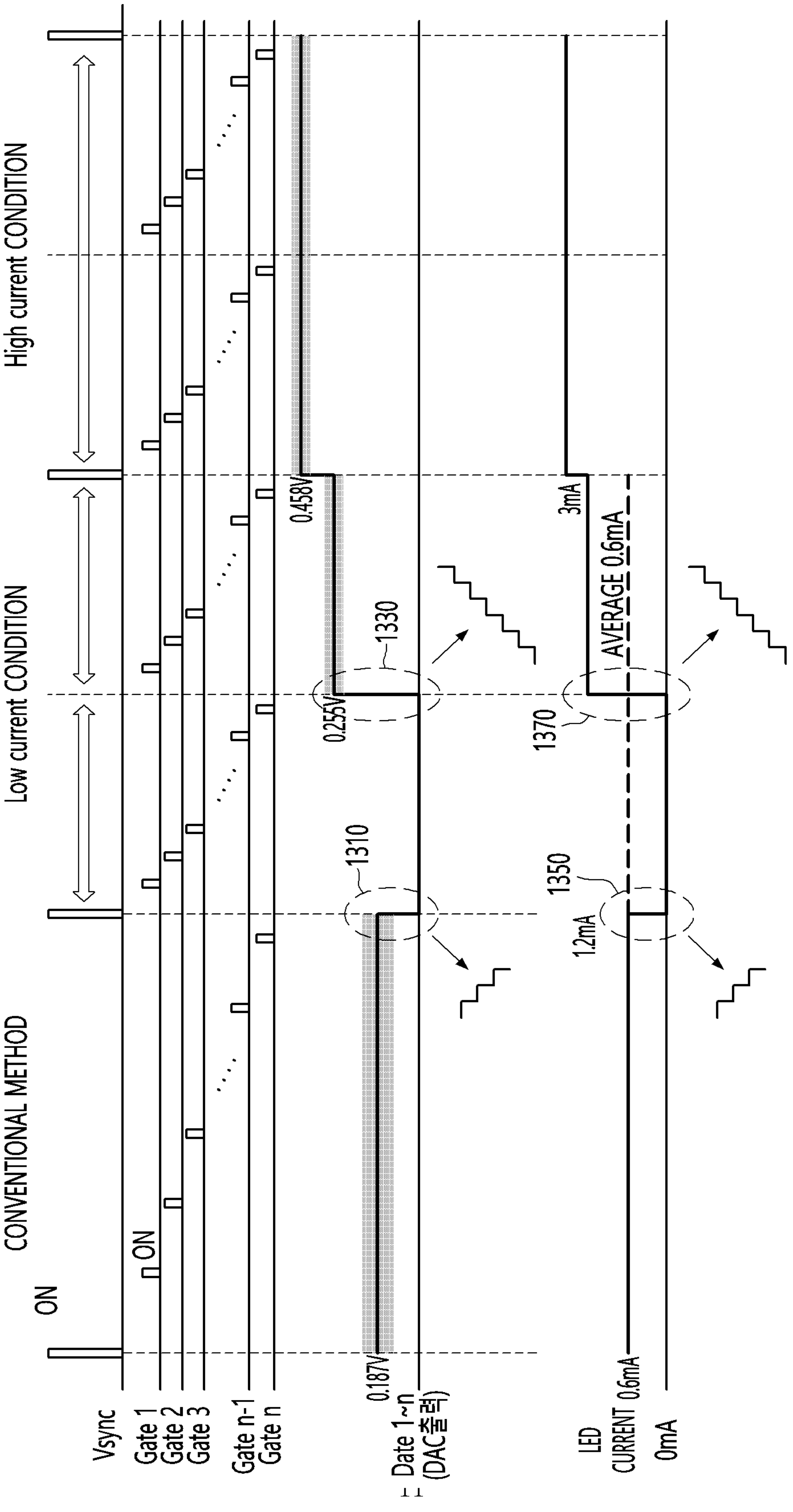
FIG. 13 is a view illustrating a local dimming control method according to another embodiment of the present disclosure.

FIG. 13 is a view illustrating a local dimming control method according to another embodiment of the present disclosure.

Referring to FIG. 13, when the low current condition is satisfied, the processor 710 may not control the LED current to 0 immediately after a previous frame cycle ends. This is because, when the LED current is changed from 0.6 mA to 0 mA, flicker may occur due to a sudden change in current.

Accordingly, the processor 710 may control current flowing in the LED such that LED current is reduced from 0.6 mA to 0 mA stepwise in a first half-cycle start section 1350 of one frame.

Similarly, the processor 710 may not control LED current to 1.2 mA which is twice 0.6 mA immediately after the first half cycle of one frame ends, under the low current condition.

In addition, when LED current is changed from 0 mA to 1.2 mA, flicker may occur due to a sudden change in current.

Accordingly, the processor 710 may control current flowing in the LED, such that LED current increases from 0 mA to 1.2 mA stepwise in the other half-cycle start section 1370 of one frame.

In order to decrease LED current stepwise, the processor 710 may decrease the voltage value of the first half-cycle start section 1310 of one frame stepwise.

Similarly, in order to increase LED current stepwise, the processor 710 may increase the voltage value of the other half-cycle start section 1330 of one frame stepwise.

Figure 14:
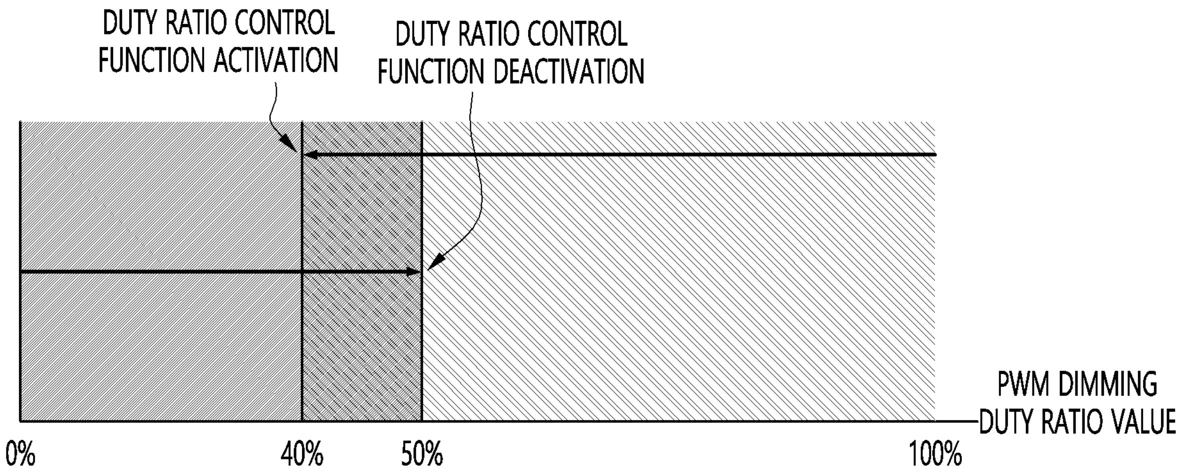
FIGS. 14 and 15 are views illustrating an activation/deactivation time of a duty ratio control function according to an embodiment of the present disclosure.
Figure 15:
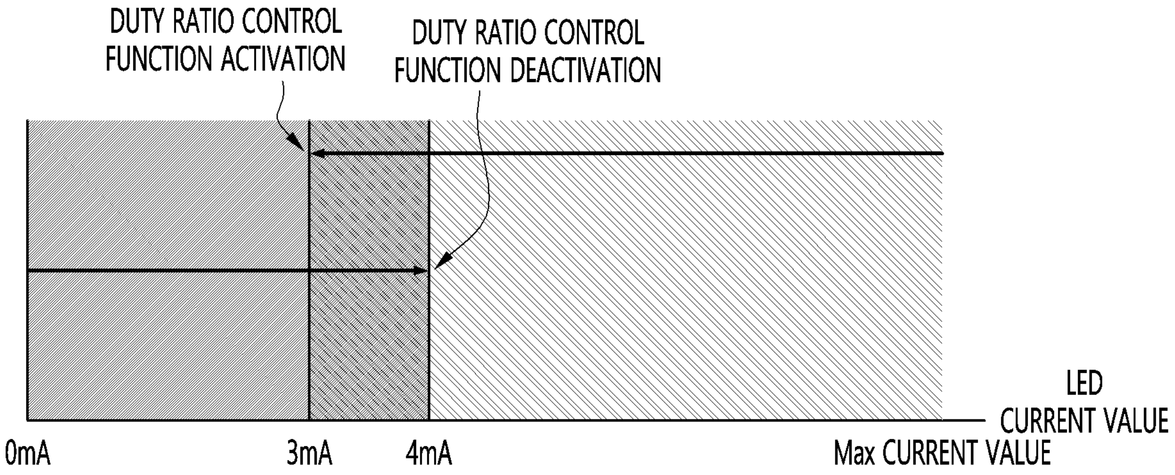

FIGS. 14 and 15 are views illustrating an activation/deactivation time of a duty ratio control function according to an embodiment of the present disclosure.

In particular, FIG. 14 is a view illustrating an example of determining activation/deactivation of the duty ratio control function based on a PWM dimming duty ratio value, and FIG. 15 is a view illustrating an example of determining activation/deactivation of the duty ratio control function based on a value of current flowing in the LED.

Referring to FIG. 14, when the PWM dimming duty ratio value is less than 40%, the backlight unit 700 may activate the duty ratio control function.

When the PWM dimming duty ratio value is 50% in a state of activating the duty ratio control function, the backlight unit 700 may disable (or deactivate) the duty ratio control function.

A first PWM dimming duty ratio value which is used as a criterion for activation of the duty ratio control function and a second PWM dimming duty ratio value which is used as a criterion for disabling the duty ratio control function may be different from each other.

This is because flicker may occur due to a sudden change in LED current, when activation or deactivation of the duty ratio control function is repeated based on the first PWM dimming duty ratio value in a state of activating the duty ratio control function.

Accordingly, in the embodiment of the present disclosure, it is possible to suppress occurrence of flicker as much as possible, by differentiating the first PWM dimming duty ratio value which is used as a criterion for activation of the duty ratio control function and the second PWM dimming duty ratio value which is used as a criterion for disabling the duty ratio control function.

Next, FIG. 15 will be described.

Referring to FIG. 15, when the LED current value is less than 3 mA, the backlight unit 700 may activate the duty ratio control function.

When the LED current value is 4 mA in a state of activating the duty ratio control function, the backlight unit 700 may disable (deactivate) the duty ratio control function.

A first LED current value which is used as a criterion for activation of the duty ratio control function and a second LED current value which is used as a criterion for disabling the duty ratio control function may be different from each other.

This is because flicker may occur due to a sudden change in LED current, when activation or deactivation of the duty ratio control function is repeated based on the first LED current value in a state of activating the duty ratio control function.

Accordingly, in the embodiment of the present disclosure, it is possible to suppress occurrence of flicker as much as possible, by differentiating the first LED current value which is used as a criterion for activation of the duty ratio control function and the second LED current value which is used as a criterion for disabling the duty ratio control function.

According to the present disclosure, during low voltage control of local dimming, it is less affected by introduction of external noise and accurate control of LED current may be performed.

The present disclosure may be embodied as computer-readable codes on a program-recorded medium. The computer-readable recording medium may be any recording medium that stores data which can be thereafter read by a computer system. Examples of the computer-readable medium may include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer may include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

What is claimed is:

1. A display device comprising:

a display panel;

a backlight unit including a plurality of blocks for providing light to the display panel, each of the plurality of blocks comprising a plurality of light emitting diodes (LEDs); and a controller configured to:

obtain backlight control information, obtain a Pulse Width Modulation (PWM) dimming duty ratio value from the backlight control information, determine that a backlight control value included in the backlight control information is less than a predetermined value, increase a voltage applied to a block and reduce a duty ratio during a cycle of one frame, based on the backlight control value being less than the predetermined value, wherein the backlight control value comprises the PWM dimming duty ratio value, and wherein the controller is further configured to determine that the backlight control value is less than the predetermined value, based on the PWM dimming duty ratio value being less than a predetermined dimming value, wherein the controller is further configured to control the block such that current flowing in the block during a half cycle of one frame is different from current flowing in the block during the other half cycle.

2. The display device of claim 1, wherein the controller is further configured to reduce the duty ratio and increase the voltage such that a product (a*b) of an increase multiple a of current flowing in the block and the duty ratio b becomes 1.

3. The display device of claim 2, wherein the controller is further configured to reduce the duty ratio and increase the voltage such that the duty ratio b becomes $((1/n)\times100)$ % when the increase multiple a is n times.

4. The display device of claim 1, wherein the backlight control value further comprises a voltage value applied to the block, and wherein the controller is further configured to determine a value of current flowing in the block based on the voltage value, and determine that the backlight control value is less than the predetermined value, based on the determined current value being less than a predetermined current value.

5. The display device of claim 1, wherein the current flowing in the block during the half cycle of the one frame is smaller than the current flowing in the block during the other half cycle.

6. The display device of claim 1, wherein the current flowing in the block is 0 during the half cycle of the one frame.

7. A local dimming control method of a display device comprising a display panel and a backlight unit including a plurality of blocks for providing light to the display panel, the local dimming control method comprising:

obtaining backlight control information;

obtaining a Pulse Width Modulation (PWM) dimming duty ratio value from the backlight control information;

determining that a backlight control value included in the backlight control information is less than a predetermined value; and increasing a voltage applied to a block and reducing a duty ratio during a cycle of one frame, based on the backlight control value being less than the predetermined value, wherein the backlight control value comprises the PWM dimming duty ratio value, and wherein determining that the backlight control value is less than the predetermined value comprises determining that the backlight control value is less than the predetermined value, based on the PWM dimming duty ratio value being less than a predetermined dimming value, wherein increasing the voltage and reducing the duty ratio further comprise controlling the block such that current flowing in the block during a half cycle of one frame is different from current flowing in the block during the other half cycle.

8. The local dimming control method of claim 7, wherein increasing the voltage and reducing the duty ratio comprise increasing the voltage and reducing the duty ratio such that a product (a*b) of an increase multiple a of current flowing in the block and the duty ratio b becomes 1.

9. The local dimming control method of claim 8, wherein increasing the voltage and reducing the duty ratio further comprise increasing the voltage and reducing the duty ratio such that the duty ratio b becomes ((1/n)×100) % when the increase multiple a is n times.

10. The local dimming control method of claim 7, wherein the backlight control value further comprises a voltage value applied to the block, and wherein the local dimming control method further comprises determining a value of current flowing in the block based on the voltage value, and determining that the backlight control value is less than the predetermined value, based on the determined current value being less than a predetermined current value.

11. The local dimming control method of claim 7, wherein the current flowing in the block during the half cycle of the one frame is smaller than the current flowing in the block during the other half cycle.

12. The local dimming control method of claim 7, wherein the current flowing in the block is 0 during the half cycle of the one frame.

13. The local dimming control method of claim 12, wherein the current flowing in the block is n times a current value of a previous frame during the other half cycle.

14. The local dimming control method of claim 13, wherein controlling the block comprises:

controlling current flowing in the block such that the current decreases to 0 gradually during a first half-cycle start section of one frame, and controlling current flowing in the block such that the current increases to n times gradually during the other half-cycle start section of one frame.

15. The display device of claim 6, wherein the current flowing in the block is n times a current value of a previous frame during the other half cycle.

16. The display device of claim 15, wherein the controller is further configured to control current flowing in the block such that the current decreases to 0 gradually during a first half-cycle start section of one frame, and control current flowing in the block such that the current increases to n times gradually during the other half-cycle start section of one frame.

* * * * *